April 17, 1928.
H. C. SCHAPER
1,666,314
EVEN BALANCE INDICATING SCALE
Filed Feb. 23, 1926  4 Sheets-Sheet 2
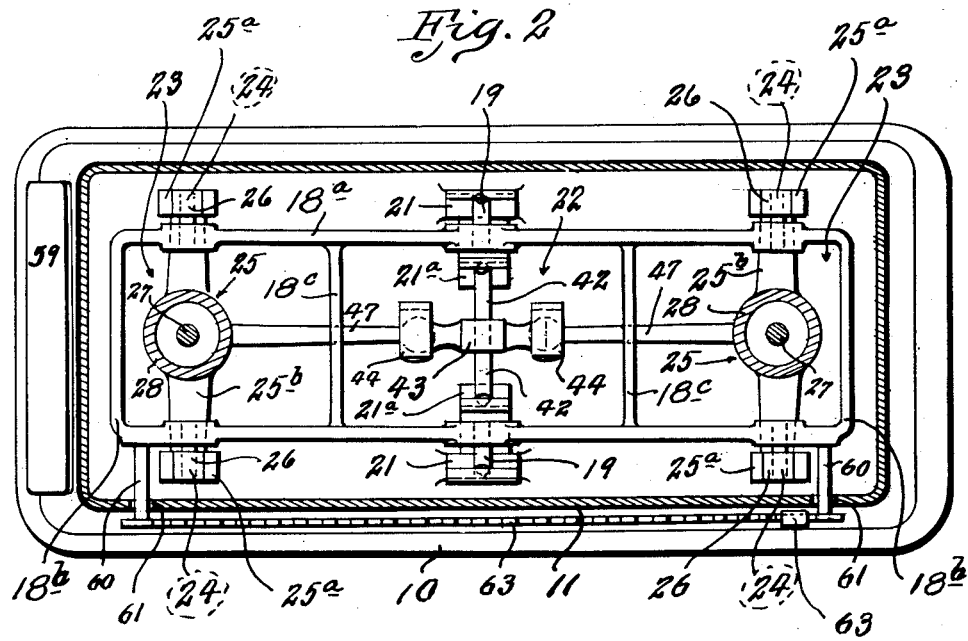
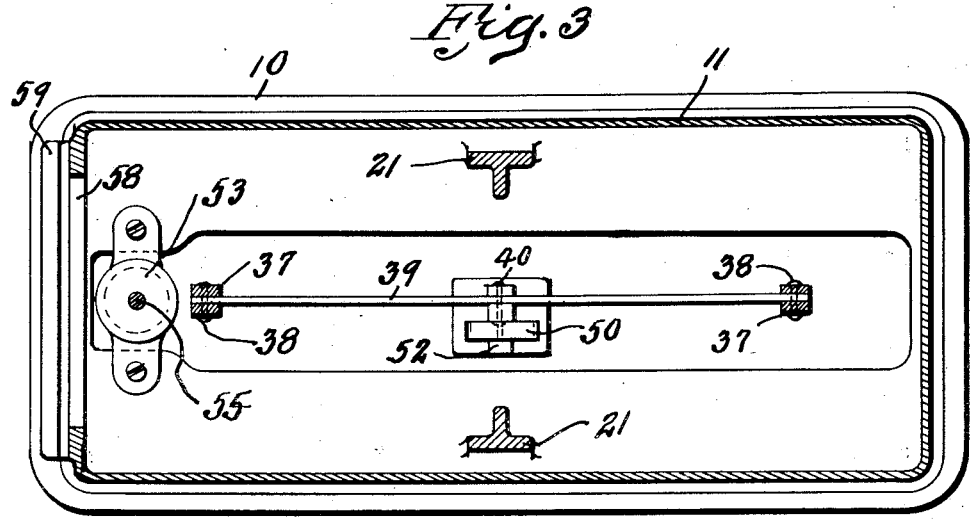
Inventor
Harry C. Schaper
By Cornwall, Bedell & Janney
Attys.

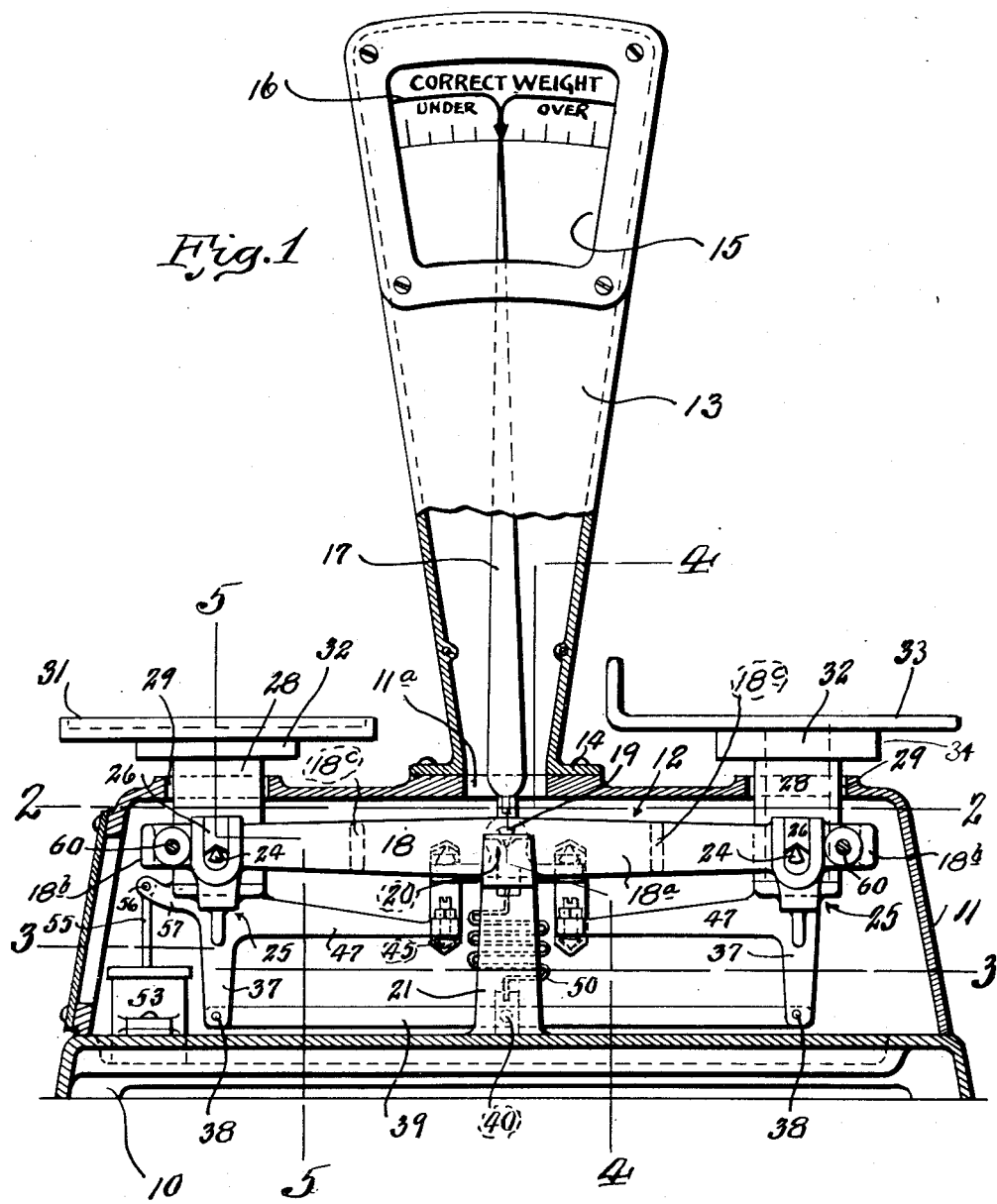

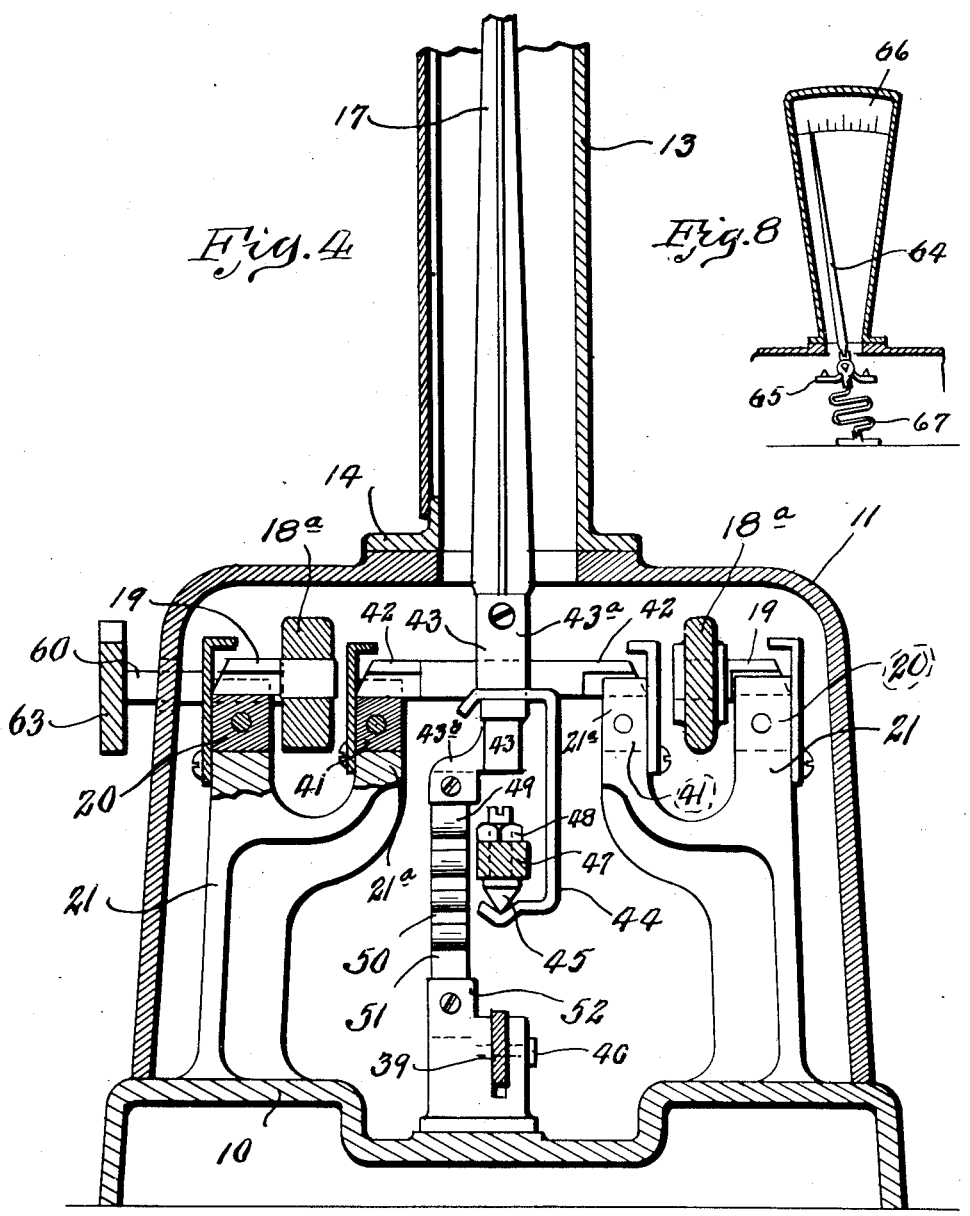

April 17, 1928. 1,666,314
H. C. SCHAPER
EVEN BALANCE INDICATING SCALE
Filed Feb. 23, 1926 4 Sheets-Sheet 4
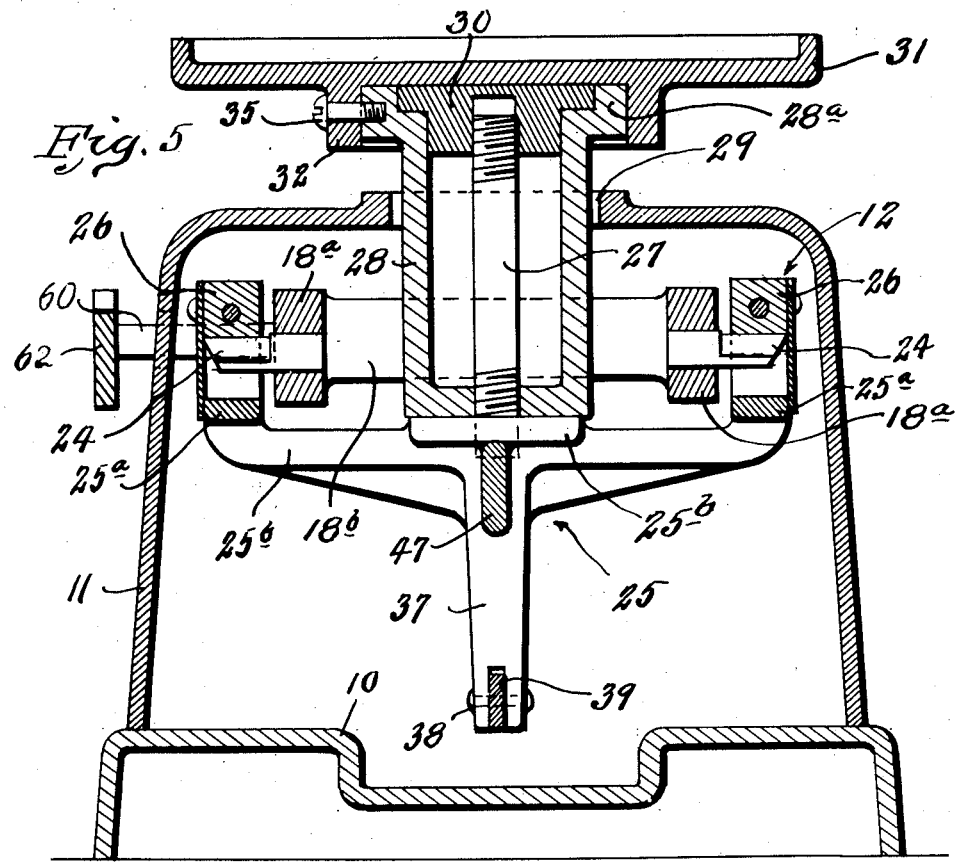
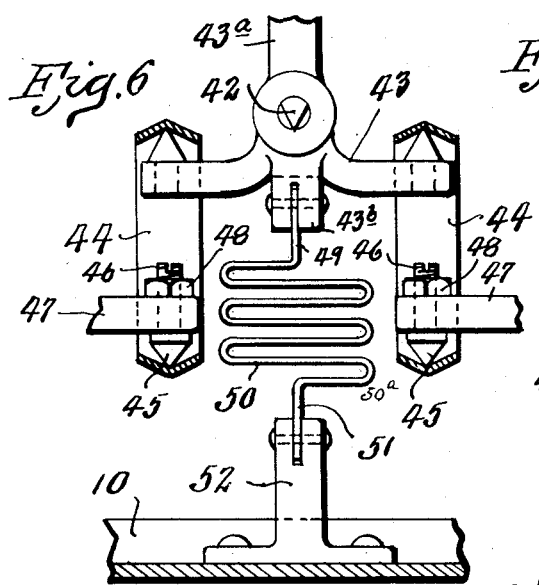
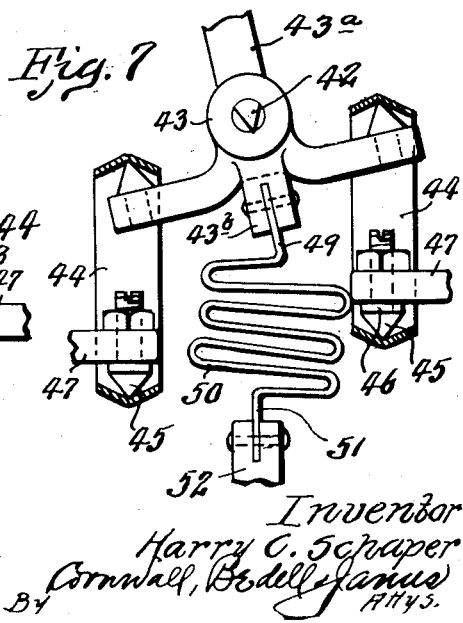
Inventor
Harry C. Schaper
By Cornwall, Bedell & Janus
Attys.

Patented Apr. 17, 1928.

1,666,314

UNITED STATES PATENT OFFICE.

HARRY C. SCHAPER, OF ST. LOUIS, MISSOURI, ASSIGNOR, BY MESNE ASSIGNMENTS, TO SCHAPER SCALE COMPANY, A COMPANY OF MISSOURI.

EVEN-BALANCE-INDICATING SCALE.

Application filed February 23, 1926. Serial No. 90,049.

This invention relates to scales and more particularly to even balance indicating scales. The objects of the invention are to provide an even balance scale which will indicate when it is in equilibrium and which will also automatically indicate whether the load placed on the load receiving platform is over or under the amount of predetermined weight for which the scale is set.

Further objects of the invention are to provide an even balance indicating scale, the balance of which is not affected by ordinary out-of-level conditions, the indicator of the scale maintaining a neutral or zero position irrespective of the position occupied by the scale.

Still further objects of the invention are to provide a resisting element consisting of a plurality of V-bent portions to increase the resistance of said element without affecting its flexibility, said element having one end fixed to a stationary member and having the opposite end secured to a part of the scale mechanism whereby the movement of the indicator utilized for indicating a predetermined amount of over or under weight is controlled by said resisting element. This element offers yielding resistance to the movement of the scale mechanism produced by the disturbance of the balance of the latter and serves to automatically control the weighing movement of the scale up to a predetermined amount.

Other objects of the invention are to provide an even balance scale having a resisting element disposed below the pivots of the beam of said scale.

Still other objects of the invention are to provide a scale of the class described with a dash pot operatively connected to one of the platform supporting members which being movable in vertical plane preserves proper alinement with the piston thereof.

Additional objects of the invention are to provide an even balance scale having a beam supporting the load and weight platforms, a resisting element coacting with said beam and having its points of attachment arranged below and in a vertical plane with the fulcrums of said beam, there being suitable weight indicating means provided for cooperating with said resisting element to indicate the extent of movement of said beam when the latter is moved out of balance.

With these and other objects in view my invention consists of certain novel features and arrangement of parts hereinafter more fully described and illustrated in the accompanying drawings, in which—

Figure 1 is a front elevational view of the scale with parts thereof in cross section to more clearly illustrate the invention.

Figure 2 is a horizontal cross section taken on line 2—2 of Figure 1.

Figure 3 is a horizontal cross section taken on line 3—3 of Figure 1.

Figure 4 is an enlarged cross section taken on line 4—4 of Figure 1.

Figure 5 is an enlarged cross section taken on lines 5—5 of Figure 1.

Figure 6 is a detail view of the resisting element and parts associated therewith.

Figure 7 is a view similar to Figure 6 but showing the parts in moved position.

Figure 8 is a view showing a modified form of the invention.

Referring by numerals to the accompanying drawings 10 indicates a base on which is supported a housing 11 which encloses a scale mechanism 12. Projecting upwardly from the top wall of housing 11 is an extension or tower 13 having a circular flange 14 at its lower end for attachment to said housing and provided in its upper end with oppositely disposed side openings 15 for rendering visible a chart 16, which is stationarily mounted within said extension. An indicator 17 which extends upwardly into said extension 13 through an opening 11ª formed in the top wall of housing 11, is adapted to cooperate with said chart 16.

A main lever or scale beam 18 is arranged in the upper portion of housing 11 and is fulcrumed by means of downwardly presented knife edge bearings or pivots 19 which extend laterally from said beam and rest in V-shaped grooves formed in upper faces of blocks 20. The latter are carried by bearings 21 preferably formed integral with base 10 and projecting upwardly therefrom.

Beam 18 is preferably formed of rectangular shape having a pair of spaced side members or beams 18ª connected at their ends by transverse end member 18ᵇ preferably formed integral therewith and connected intermediate their ends by transverse members 18ᶜ, also formed integrally therewith. Thus beam 18 is formed in the shape of a unitary rectangular member having a central opening or clearance space 22 and end openings or clearing spaces 23. A pair of upwardly presented laterally projecting knife edge pivots 24 is arranged in beam 18 a definite distance on each side of fulcrums 19 and extend outwardly from side members 18ª. These knife edge pivots 24 form pivotal points of suspension for platform supporting members 25 which latter are arranged transversely and extend under the respective end portions of beam member 18. Members 25 are supported on pivots 24 by means of blocks 26 which are secured to upwardly presented ends 25ª of members 25 and are provided with downwardly presented V-shaped grooves for engaging the knife edges or pivots 24. Each member 25 is formed with a horizontal disposed bar 25ᵇ, preferably arranged equal distance and in alinement with the vertical planes of the pivotal points of engagement of members 24 and 26.

A bolt or pin 27 is seated in said bar 25ᵇ and extends upwardly a suitable distance. Supported on each bar 25ᵇ is a cylindrical member 28, the lower end of which has a threaded engagement with pin 27, while the upper end extends outwardly through opening 29 formed in the top wall of housing 11 and is provided with an annular flange 28ª. A lock member 30 is screwed on the threaded upper end of pin 27 and bears against the upper end of cylindrical member 28 and locks the latter in position.

A weight receiving platform 31 is provided with a depending circular flange 32 which when platform 31 is in position encloses the annular flange of member 28. A load receiving platform 33 rests on the upper end of the other member 28 and is provided with a depending circular flange 34 for enclosing the flanged end of said member 28. A screw 35 is screw seated in each flange 28ª and projects laterally therefrom through an opening 36 formed in the respective flange of each platform 31 and 33 and locks the corresponding platforms in position on member 28. Depending from each member 25 is an extension 37 to the lower end of which is pivotally connected as at 38, one end of a check rod 39, fulcrumed at 40 at a point below and in vertical plane with pivots 19 and beam 18. This check rod serves to maintain platforms 31 and 33 in horizontal positions and eliminates swinging movements of member 25.

Each beam 21 is formed with an extension 21ª which extends under the corresponding side member 18ᶜ and carries a block 41 having an upwardly presented V-shaped groove. A knife edge member 42 extends laterally from each side of a lever 43 and rests in the groove of the corresponding block 41 thereby providing fulcrum for lever 43.

A loop 44 is pivotally suspended from each end of lever 43 and the lower end of each loop is pivotally engaged by the downwardly presented point 45 of a member 46, which latter is mounted in the end of a corresponding arm 47. These arms are formed integral with the respective members 25 and project in opposite direction towards lever 43. Each member 46 is preferably arranged in the form of a screw having a threaded engagement with the respective end of the corresponding arm 47. By turning screw 46 in proper direction the point 45 thereof can be adjusted in vertical plane so as to provide proper operative relation between lever 43 and platform supports 25. A lock nut 48 is preferably used to lock each member 46 against accidental displacement.

A lever 43 is provided with an upward extension 43ª to which is attached the lower end of pointer 17, so that the latter is movable with lever 43. Extension 43ª is so arranged that when lever 43 is in balance, said extension and pointer 17 occupy vertical position substantially in vertical plane with the pivots of said lever.

This lever 43 is also provided with a depending portion 43ᵇ to which is secured the upper end 49 of a resisting element 50, the lower end 51 of which is anchored to a lug 52 which is stationarily arranged on base 10.

Resisting element 50 is preferably formed of a strip of resilient or spring material of suitable width and proper thickness so as to provide the desired degree of flexibility and insure the return of said element to its normal shape when it is distorted by extraneous means. This strip is rebent upon itself to provide a series of horizontally disposed coils 50ª, preferably placed equal distance from each other and arranged in a vertical plane with each other and with the projecting ends thereof. By forming said element with a plurality of coils 50ª the resiliency of the element is thereby increased without placing any portion of said element to any severe strains thereby insuring long life of the element and eliminating all the danger of breakage thereof when in service.

This element being stationarily attached at one end and secured at the opposite end to a portion of lever 43, it is obvious that the movement of said lever and pointer 17 will be yieldingly resisted by said element thereby controlling the movement of said pointer so that the latter will indicate in correlation with the stationary chart 16 the predetermined amount of over or under weight necessary to offset the resiliency of element 50 and distort the latter from its normal position. This element 50 and portions 43ᵇ and lug 52 are preferably spaced to one side of the axes of the pivotal connections of loops 44, but the point of attachment of said resisting element 50 with said lever 43 is disposed radially relative to the fulcrum 42 of lever 43.

A dash-pot 53, having a stem 52 and a piston (not shown,) is arranged near one end of base 10 and said stem 52 is pivotally connected at 56 to a lug 57 which is formed integral with and projects outwardly from one of the members 25. Member 25 being movable in vertical plane only, the stem 55 and piston carried thereby will be consequently actuated in vertical plane, thereby eliminating all binding or sticking of the dash-pot mechanism that is ordinarily caused when dash-pot is connected to scale beam because of angular travel. The corresponding end wall of housing 11 is provided with an opening 58 through which access may be had to dash-pot 53 and its connection. This opening is normally closed by a closure member 59.

Projecting laterally from one of the side members 18ᵃ are horizontally disposed pins 60 which project outwardly from housing 11 through suitable slots 61 formed thereon, and carry a graduated beam 62, on which is adjustably arranged a poise 63. By moving this poise along beam 62, any fractional amount of a pound is set up in the scale mechanism.

In the form shown in Fig. 8 a pointer 64, carried by a lever 65, is arranged to cooperate with a chart 66 to indicate the weight placed on the receiving platform. A resisting element 67 is preferably disposed in alignment with the indicator and assists in bringing the pointer to zero position.

The resiliency of resisting element 50 can be varied to adapt the side for varying apertures. For instance if in the present instance the capacity is 1 oz. over or under weight the marks indicating ¼ oz. each and it is desired to register ⅛ oz. on the scale a resisting element which is more yielding is placed in the scale. This can be rendered more yielding by either increasing the number of coils, or reducing the width or thickness of the strip or by the combination of any of the above.

On the other hand by increasing the width or thickness of the strip the scale can be rendered less sensitive and register for ½ oz. up.

While I have shown and described the preferred form of my invention, it is obvious that various changes and modifications can be made in the construction of my improved scale without departing from the spirit of my invention.

I claim:

1. An even-balance scale comprising a scale beam, platform supports carried by said beam, a pivotally suspended lever operatively connected to said platform supports, a weight indicating member extending from said lever, and a resisting element anchored at one end and having its opposite end secured to said lever for controlling the movement of said weight indicating member to indicate a predetermined amount of over and under weight.

2. An even-balance scale comprising a scale beam, platform supports carried thereby, a lever pivotally mounted in correlation with said scale beam and operatively connected to said platform supports, weight indicating means correlated with said lever to indicate a predetermined amount of over or under weight, and a resisting element disposed beneath said lever and secured at its upper end thereto and having its lower end stationarily fixed whereby the movement of said lever and said weight indicating means is yieldingly controlled by said element.

3. An even-balance scale comprising a scale beam, platform supports pivotally carried by said scale beam, a lever pivotally mounted in fulcrum alignment with said beam, means operatively connecting said lever with said platform supports, a pointer extending from said lever to indicate a predetermined amount of over or under weight, a stationary weight indicia chart correlated with said pointer, and a resisting element having one end stationarily fixed and the opposite end secured to said lever at a point in vertical plane with the fulcrums of said lever for controlling the movement of said pointer.

4. An even-balance scale comprising a scale beam, platform supports pivotally supported by said scale beam, a lever pivotally mounted in axial alignment with said scale beam, an arm projecting inwardly from each support and having pivotal connection with said lever, weight indicating means for indicating a predetermined amount of over or under weight, and a resisting element in cooperative relation with said weight indicating means, said element having rebent spaced portions for increasing the resiliency thereof.

5. An even-balance scale comprising a scale beam, platform supports pivotally mounted on the ends of said scale beam, a lever mounted coaxially with said beam, a loop suspended from each end of said lever, an arm extending inwardly from each platform support and pivotally engaging the lower end of the respective loop, weight indicating means operable by said lever to indicate a predetermined amount of over and under weight, and a resisting element disposed below said lever and in vertical plane with the axis thereof for yieldingly maintaining said weight indicating means in zero position.

6. An even-balance scale comprising a scale beam, platform supports pivotally suspended from each end of said scale beam, a lever fulcrumed independently of said beam and in alignment with the fulcrums thereof, rigid extensions projecting inwardly from each platform support and arranged below said beam and operatively interengaging said lever, a vertically disposed resilient member having its lower end stationarily fixed and having its upper end secured to said lever for yieldingly resisting the movement thereof, and a pointer carried by said lever to indicate a predetermined amount of over and under weight and controlled by said resilient member.

7. An even-balance scale comprising a scale beam, platform supports pivotally suspended from each end of said scale beam, a lever fulcrumed independently of said beam and in alignment with the fulcrums thereof, rigid extensions projecting inwardly from each platform support and arranged below said beam and operatively interengaging said lever, a vertically disposed resilient member having its lower end stationarily fixed and having its upper end secured to said lever for yieldingly resisting the movement thereof, a stationary chart member provided with weight indicia indicating over and under weight, and a pointer correlated with said chart member and in cooperative relation with said lever to indicate a predetermined amount of over or under weight.

8. An even-balance scale comprising a scale beam, a lever coacting with said scale beam, weight indicating means cooperating with said lever, and a resisting element arranged below and in vertical plane with the fulcrum of said lever and having the lower end stationarily fixed and the upper end secured to said lever for yieldingly controlling the movement of said lever and said weight indicating means.

9. An even-balance scale comprising a scale beam, a lever coacting with said scale beam and fulcrumed in vertical and horizontal planes with the fulcrum of said scale beam, a stationary chart, a pointer carried by said lever and cooperating with said chart to indicate a predetermined amount of over or under weight, and a resisting element disposed below said lever and having one end stationarily fixed and the other end secured to said lever at points in vertical plane with the fulcrum thereof for controlling the movement of said pointer.

10. In a scale, the combination with a system of levers, of a pointer for indicating a predetermined amount of over or under weight, said pointer being fulcrumed in the same horizontal plane with said levers and being operatively connected thereto, and a resisting element disposed in a vertical plane with the fulcrum of said pointer and having its upper end secured thereto below the fulcrum thereof for controlling the indicating movement of said pointer.

11. In a scale, the combination with a pair of coacting levers having coaxial fulcrums, of a stationary chart having weight indicia for indicating over and under weight, a pointer carried by one of said levers and cooperating with said chart to indicate a predetermined amount of over or under weight, and a resisting element disposed below and in vertical plane with the fulcrum of said levers and having one end stationarily fixed and the opposite end secured to one of said levers for controlling the movement of said pointer.

12. In a scale, a resisting element comprising a resilient member rebent to provide horizontally disposed convolutions arranged in a vertical plane with each other and adapted to have and having one end fixed to a movable part of a scale and the opposite end fixed to a stationary part.

13. In a scale, the combination with a scale beam, and a pointer for indicating a predetermined amount of over or under weight, said pointer having its fulcrum arranged in the same horizontal plane with said scale beam, of a resisting element disposed below said scale beam and having one end stationarily fixed and having the other end secured to said pointer for controlling the indicating movements of said pointer.

14. In a scale, the combination with a weight receiving member and a load carrying member, of a beam supporting said members and actuated thereby, and a secondary lever fulcrumed in the same horizontal plane with said beam and actuated thereby and having differential speed relation relative thereto, a weight indicating pointer carried by said secondary lever and a resilient member having horizontally disposed convolutions arranged in a vertical plane with each other and having one end fixed to said secondary lever for yieldingly maintaining said pointer in neutral position.

15. In a scale, the combination with a weight receiving member and a load carrying member, of an even-balance beam pivotally supporting said members and actuated thereby, a lever fulcrumed in the same horizontal plane with said beam and actuated by said carrying member and having differential speed relation relative to said beam, a resilient element stationarily fixed at one end and connected at its opposite end to said lever for yieldingly resisting the movement of said lever from neutral position, and a weight indicating pointer actuated by said lever.

16. In an even-balance scale, the combination with a scale beam, of a load and weight carrying members pivotally supported by said scale beam, an arm projecting inwardly from each member, and an indicator for indicating a predetermined amount of over or under weight, said indicator being pivotally mounted and actuated by said arms.

17. In a scale, the combination with a load receiving member, of a primary lever supporting said load receiving member and movable in accordance with the load placed thereon, a secondary lever coaxially arranged with said primary lever and operable thereby and having differential speed relation therewith for indicating the amount of weight placed on said receiving member, and a resilient resisting element operatively connected to said secondary lever and arranged in a vertical plane with, and below the fulcrum of said levers for yieldingly maintaining the latter in neutral position.

18. In a scale, the combination with a load receiving member, of a primary lever carrying said load receiving member and movable in accordance with the load placed thereon, a secondary lever mounted coaxially with said primary lever operable thereby and having differential speed relation therewith, weight indicating means operable by said secondary lever, and a resilient resisting element operatively connected to said secondary lever and arranged in a vertical plane with, and below the fulcrums of said levers for yieldingly maintaining said weight indicating means in neutral position.

19. In a scale, the combination with a load actuated scale beam, of a pair of vertically movable members carried by said beam and disposed on each side of the fulcrum thereof, a lever in operative engagement with said members and operable thereby and having differential speed relation with said scale beam, a weight indicating means operable by said lever, and a resisting element connected to said lever for yieldingly resisting the movement of said lever.

20. In a scale, the combination with a load actuated scale beam, of a vertically movable member arranged on each side of the fulcrum of said beam, a lever operatively connected to said members and having differential speed relation with said beam, a stationary weight indicia member, a pointer carried by said lever and correlated to said weight indicia member, and a resisting element arranged below the fulcrums of said beam and said lever and connected to said lever for yieldingly resisting the movement of said lever.

21. In a scale, the combination with a load actuated scale beam, of a vertically movable member carried by said beam on each side of the fulcrum thereof, a rigid extension on each member projecting inwardly toward each other, a lever operatively connected to said extensions and having differential speed relation with said beam, a stationary weight indicia member, a pointer carried by said lever and correlated to said weight indicia member, and a resisting element stationarily fixed at one end and having the opposite end secured to a radial projection of said lever for yieldingly resisting the movement of the latter.

22. In a scale, a resisting element comprising a series of horizontally disposed convolutions arranged in a vertical plane with each other and having one end adapted to be stationarily anchored and the opposite end adapted to be secured to a movable part of a scale.

23. In a scale, a resisting element comprising a member having a series of rebent coils spaced from each other and terminating in oppositely disposed extremities one of which is adapted to be stationary and the other movable.

24. In a scale, a resisting element comprising a resilient member having a series of rebent coils spaced from each other and terminating in oppositely disposed portions, one of which is stationary and the other movable laterally relative thereto.

In testimony whereof I hereunto affix my signature this 20th day of February, 1926.

HARRY C. SCHAPER.